United States Patent Office 3,387,680
Patented June 11, 1968

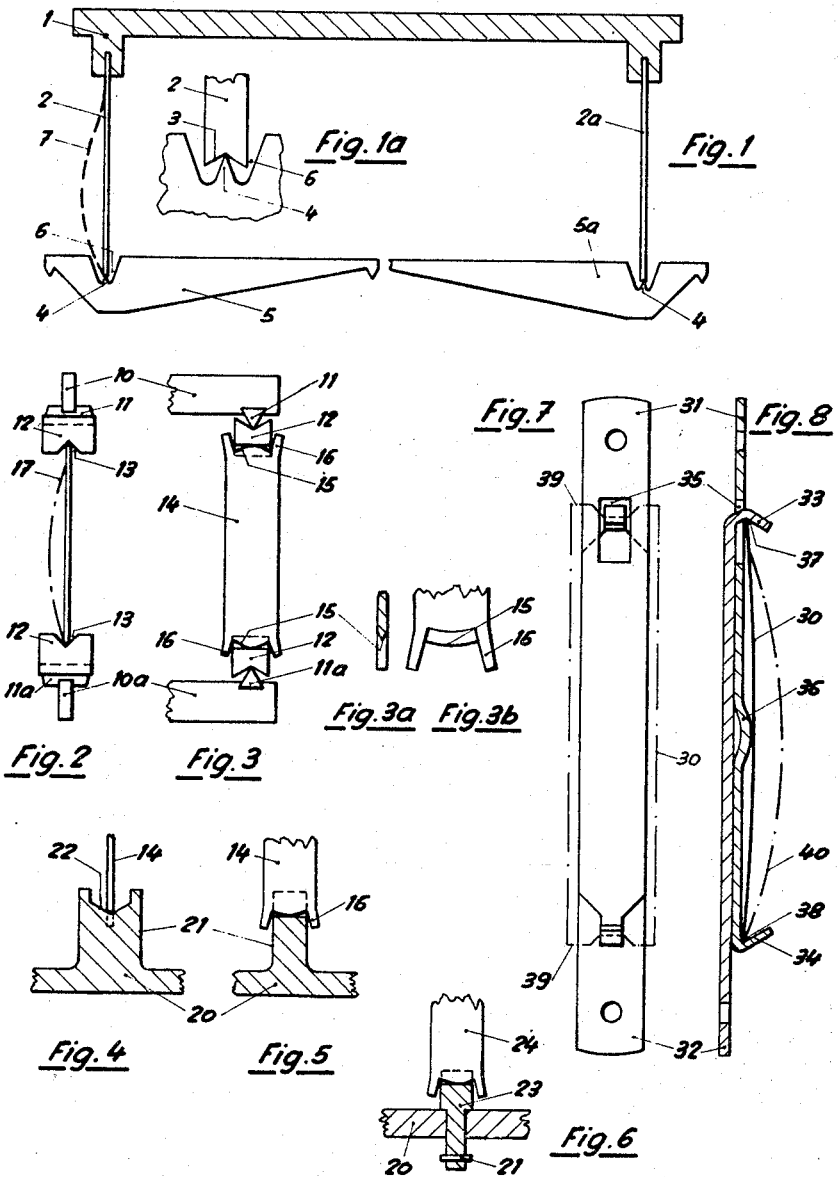

3,387,680
OVERLOAD PROTECTING DEVICE FOR MEASURING INSTRUMENTS, PARTICULARLY WEIGHING MACHINES
Johannes Wirth, Zurich, Switzerland, assignor to Wirth, Gallo & Co., Zurich, Switzerland
Filed Dec. 21, 1966, Ser. No. 603,473
Claims priority, application Switzerland, Jan. 20, 1966, 727/66
2 Claims. (Cl. 177—189)

ABSTRACT OF THE DISCLOSURE

A weighing machine comprising a load platform, load compensating and indicating means, and load transmitting elements operatively coupled from the load platform to said last-mentioned means, the improvement comprising at least one of the load transmitting elements being a buckling spring.

---

The present invention relates to an overload protective device for measuring instruments, particularly weighing machines, comprising at least one spring for absorbing forces generated by static and dynamic overloads which might otherwise damage the measuring elements of the instrument.

Overload protective devices of the specified kind have been proposed in a diversity of forms of construction. Usually the springs are biased, the biasing load corresponding to the maximum static load plus a small allowance to provide a margin. Such springs may be included in the tension rod of an inclination balance or incorporated between other load transmitting parts, for instance between a weighbridge and a load bearing lever arm.

Excessive loads which could damage measuring elements of the instrument may be generated by excessive static loads (e.g. by placing an excessively heavy weight on the balance) or they may be dynamically generated (for instance by the impact of a smaller load that has been dropped on the balance), or they may be loads which arise during transportation.

It is the object of the present invention to provide an overload protective device which offers considerable functional advantages besides being advantageous from the point of view of manufacturing cost. The invention consists in providing as an overload protective device an element which collapses under a buckling load.

Embodiments of the invention are schematically illustrated in the accompanying drawings in which FIG. 1 is the bearing mechanism of a weighbridge, FIG. 1a is a detail thereof on a larger scale, FIGS. 2 and 3 are front and side elevations of a second embodiment, FIGS. 3a and 3b show the end of the spring on a larger scale, FIGS. 4 and 5 are front and side elevations of a third embodiment, FIG. 6 is a modification of the embodiment shown in FIGS. 4 and 5, and FIGS. 7 and 8 are front and side elevations of a fourth embodiment.

Two leaf springs 2, 2a are rigidly clamped to a weighbridge 1. The bottom end of each leaf spring (FIG. 1a) is formed with a V-notch 3 which rests on a knife edge 4 provided on one of each of the two weighbeams 5 and 5a. The knife edges 4 on the weighbeams 5 and 5a are formed in the bottom of a narrow tapering groove 6 to ensure that the knife edge will correctly engage the notch 3 when the spring is inserted. When the leaf spring 2 is flexurally bent, the taper cross section of the groove 6 permits the bottom end of the spring to perform the necessary pivoting motion without making contact with the sides of the groove 6 in the weighbeams 5 or 5a. On the left hand side of FIG. 1 the shape 7 of a leaf spring 2 flexurally collapsing under a buckling load is indicated. The embodiment according to FIG. 1 is particularly suitable for weighing machines of lower load-bearing capacity. The upper end of each leaf spring 2 and 2a operates in the manner of an elastically flexing secondary hinge.

FIGS. 2 and 3 are front and side elevations of a leaf spring flexurally buckling under compression for coupling together two weighbeams. Each weighbeam 10 and 10a has a knife edge 11, 11a supporting bearing members 12 of conventional kind. Each bearing member 12 is formed with a transverse V-notch 13. The leaf spring 14 is provided at each end (FIGS. 3a and 3b) with an arcuate knife edge 15 extending between lateral abutments 16. FIG. 2 indicates the shape 17 of the flexurally buckled leaf spring.

Instead of transmitting thrust between the two levers 10 and 10a the same leaf spring may also be used to provide an overload protective lever supporting strut.

FIGS. 4 and 5 illustrate how support may be effected for instance from a baseplate. The baseplate 20 is formed with a chair 21 formed with a V-notch 22. The leaf spring 14 rests in this notch. The lateral abutments 16 prevent the spring from sliding off.

FIG. 6 is an embodiment illustrating the manner in which a leaf spring 24 can be used for supporting a lever and at the same time as an arresting means. In this arrangement the spring rests not on a chair formed on the baseplate 20 but on a special notched slidable bolt 23. The bolt 23 extends through the baseplate 20 and its bottom end carries a pin 21 in a position permitting upward axial movement of the bolt 23. For arresting the weighing machine the bolt 23 can be raised by elements not shown in the drawing until the pin 21 is intercepted by the baseplate.

A known method of arresting weighing machines during transportation is to apply a given thrust to the bridge and the lever mechanism.

The described leaf spring 24 is suitable for performing two functions at the same time. On the one hand, it may provide protection against overloading and, on the other hand, it may be used as described during transportation by means of its thrust when flexed to press the supported lever against stop means not shown in the drawing when the sliding bolt 23 is raised.

FIGS. 7 and 8 show another embodiment in front and side elevation, comprising a flexurally buckling leaf spring 30 functioning as an overload protective device in an element loaded for tension. Two overlapping metal strips 31 and 32 are each formed with a hooked end 33 and 34. The hooked end 33 of the metal strip 32 passes through an elongated opening 35 in the other metal strip 31 which is provided with a projecting rib-shaped bulge 36. The ends 37, 38 of the leaf spring 30 are each provided with two lateral extensions for embracing and engaging the hooks 33 and 34. The projecting bulge 36 imparts a slight outward initial deflection (in FIG. 8 to the right) to the leaf spring. When the described arrangement is loaded for tension above the flexing resistance of the spring 30, the spring will flexurally buckle and assume the position indicated by 40 in the drawing.

As has already been mentioned it has already been proposed to use biased springs as overload protective devices. However, apart from the simplicity of the proposed flexurally buckling leaf springs these have the special advantage that their endwise thrust remains substantially constant when the spring is flexed and that it is hardly affected by the degree of deflection, a property not shared by tension, compression and torsion springs.

I claim:

1. A weighing machine comprising a load platform, load compensating and indicating means, and load transmitting elements operatively coupled from the load platform to said last-mentioned means, the improvement comprising at least one of the load transmitting elements being a buckling spring.

2. A weighing machine according to claim 1 wherein said buckling spring is a leaf spring which ends have the worm of knife edges of arcuate configuration bounded by abutments.

References Cited

UNITED STATES PATENTS 2,060,043 4/1913 Walker _____ 177—188

FOREIGN PATENTS 786,279 11/1957 Great Britain.

RICHARD B. WILKINSON, *Primary Examiner.*

GEORGE H. MILLER, Jr., *Assistant Examiner.*